(12) United States Patent
Naidu et al.

(10) Patent No.: US 9,930,004 B2
(45) Date of Patent: Mar. 27, 2018

(54) METHOD AND APPARATUS FOR EXPEDITED DOMAIN NAME SYSTEM QUERY RESOLUTION

(71) Applicant: AT&T Intellectual Property I, L.P., Atlanta, GA (US)

(72) Inventors: Lakshminarashimhan Naidu, Pearland, TX (US); Bernard S. Ku, Austin, TX (US); Thomas P. Benzaia, Sugarland, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 342 days.

(21) Appl. No.: 14/881,559

(22) Filed: Oct. 13, 2015

(65) Prior Publication Data

US 2017/0104714 A1 Apr. 13, 2017

(51) Int. Cl.

| | |
|---|---|
| G06F 15/16 | (2006.01) |
| H04L 29/12 | (2006.01) |
| H04L 29/08 | (2006.01) |
| H04L 12/725 | (2013.01) |

(52) U.S. Cl.
CPC ...... *H04L 61/1511* (2013.01); *H04L 45/3065* (2013.01); *H04L 67/1014* (2013.01); *H04L 61/1552* (2013.01)

(58) Field of Classification Search
CPC ............. H04L 61/1511; H04L 45/3065; H04L 67/1014; H04L 61/1552
See application file for complete search history.

(56) References Cited

U.S. PATENT DOCUMENTS

| | | | |
|---|---|---|---|
| 6,839,759 B2 * | 1/2005 | Larson ................ | H04L 63/0876 709/227 |
| 7,099,957 B2 | 8/2006 | Cheline et al. | |
| 7,630,374 B2 | 12/2009 | Inouchi et al. | |
| 7,734,792 B2 * | 6/2010 | Kumar ................ | H04L 63/0272 709/227 |
| 7,734,822 B2 | 6/2010 | Poeluev | |
| 7,970,765 B1 | 6/2011 | Olsen et al. | |
| 8,156,199 B1 | 4/2012 | Hoche-mong et al. | |
| 8,249,081 B2 | 8/2012 | Chang et al. | |
| 2002/0103931 A1 | 8/2002 | Mott | |
| 2004/0107286 A1 * | 6/2004 | Larson .............. | H04L 29/12216 709/229 |
| 2005/0066041 A1 * | 3/2005 | Chin ................... | H04L 12/4641 709/228 |

(Continued)

FOREIGN PATENT DOCUMENTS

WO WO 2014/148483 9/2014

*Primary Examiner* — Moustafa M Meky

(57) ABSTRACT

In one embodiment, a method and apparatus for resolving domain name system queries using unique top-level domains in a private network space are disclosed. For example, the method determines that a domain name service query specifies a destination residing in a private network space rather than in a public Internet space. The method then routes the domain name service query to a top-level domain name service server associated with the private network space, without routing the domain name service query to a root domain name service server in the public Internet space. The top-level domain name system server resides in the highest level of a hierarchy of domain name system servers belonging to the private network space.

20 Claims, 4 Drawing Sheets

(56) References Cited

U.S. PATENT DOCUMENTS

2006/0080441 A1 4/2006 Chen et al.
2008/0005792 A1* 1/2008 Larson .............. H04L 29/12216
726/15

* cited by examiner

METHOD AND APPARATUS FOR EXPEDITED DOMAIN NAME SYSTEM QUERY RESOLUTION

The present disclosure relates to a method and apparatus for resolving domain name system queries using unique top-level domains in a private network space.

BACKGROUND

An Internet Protocol (IP) address is a unique numerical string (e.g., 18.72.0.3) that is assigned to a device that participates in a computer network using IP for communication. Because IP addresses are typically difficult to remember, the device may also be assigned a more descriptive host name (e.g., host.att.net) that is easier to remember. The host name includes a domain name (e.g., att.net) that identifies a realm of administrative authority to which the device belongs. Domain names are organized into hierarchical subdomains of a nameless root domain. For example, the subdomains may include top-level domains (e.g., .net, .com, .edu) as well as lower-level domains that may be reserved by end users who wish to connect local area networks (LANs) to the Internet or to make certain resources such as web sites accessible to the public.

SUMMARY OF THE DISCLOSURE

In one embodiment, a method and apparatus for resolving domain name system queries using unique top-level domains in a private network space are disclosed. For example, the method determines that a domain name service query specifies a destination residing in a private network space rather than in a public Internet space. The method then routes the domain name service query to a top-level domain name service server associated with the private network space, without routing the domain name service query to a root domain name service server in the public Internet space. The top-level domain name system server resides in the highest level of a hierarchy of domain name system servers belonging to the private network space.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used where possible, to designate identical elements that are common to the figures.

DETAILED DESCRIPTION

When an and use submits a query containing a host name to a network-supported service (e.g., an IP multimedia service) the Domain Name System (DNS) resolves the corresponding IP address via a hierarchical system of servers. The end user's computer (or a proxy) will first query a root DNS server for the address of the server associated with the top-level domain. Then, the computer queries the top-level domain's DNS server for the address of the server associated with the next-level domain. This processes continue iteratively, working from the top-level domain to the lowest-level domain, until the IP address corresponding to the host name is resolved and returned to the end user's computer.

The round trip time (RTT) for traditional DNS resolution including queries to the root server, is typically approximately one second or more, which may be unacceptably long for IP-rich service termination. For instance, many critical mobility services such as short messaging service, Voice ever Long Term Evolution (VoLTE) services, or video calling, demand quick RTT (e.g., less than approximately one hundred milliseconds) for call setup. Moreover, many top-level domains are in the pubic Internet space, and therefore maw not be subject to the same service level agreements (SLAs) as, for example, a multiprotocol label switching (MPLS)-based virtual private network (VPN).

The present disclosure broadly describes a method, a computer-readable storage device, and an apparatus for expedited domain name system query resolution. Embodiments of the present disclosure implement a unique top-level domain within a private MPLS space that controls access to lower-level DNS servers and domains without requiring the routing of queries to a root DNS server. In addition, a DNS resolver is implemented that is capable of determining when a DNS query specifies is destination that is in the public Internet space or in a private network space and routing the DNS query for resolution accordingly. The resolution speed meets the requirements of services including mobility VoLTE, Carrier Voice over Internet Protocol (cVoIP), mobile switching centers (MSCs), Internet imaging Protocol (IIP), Web Real-Time Communication (WebRTC), and IP-based interoperability. In addition to resolving queries more quickly, the present disclosure infrastructure is also capable of exercising tighter control over access to DNS services, including services that are supported by a infrastructure residing in a private network space.

Figure 1:
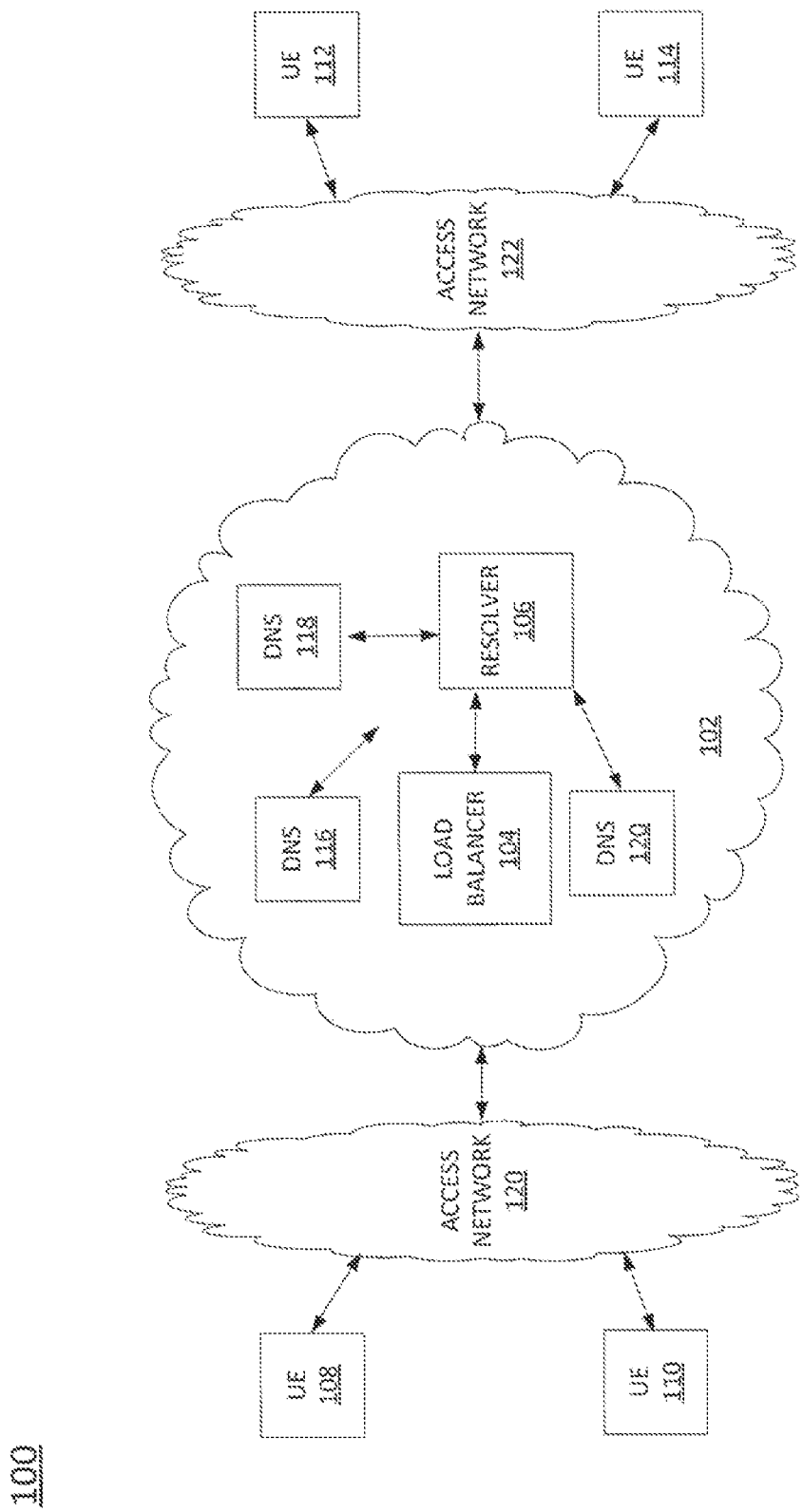
FIG. 1 is a block diagram depicting one example of a communications network.

FIG. 1 is a block diagram depicting one example of a communications network 100. In one example, the communications network 100 is an Internet Protocol (IP) network (e.g., an IP Multimedia Subsystem (IMS) network, a long term evolution (LTE) network, or the like). It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access network's 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

Figure 4:
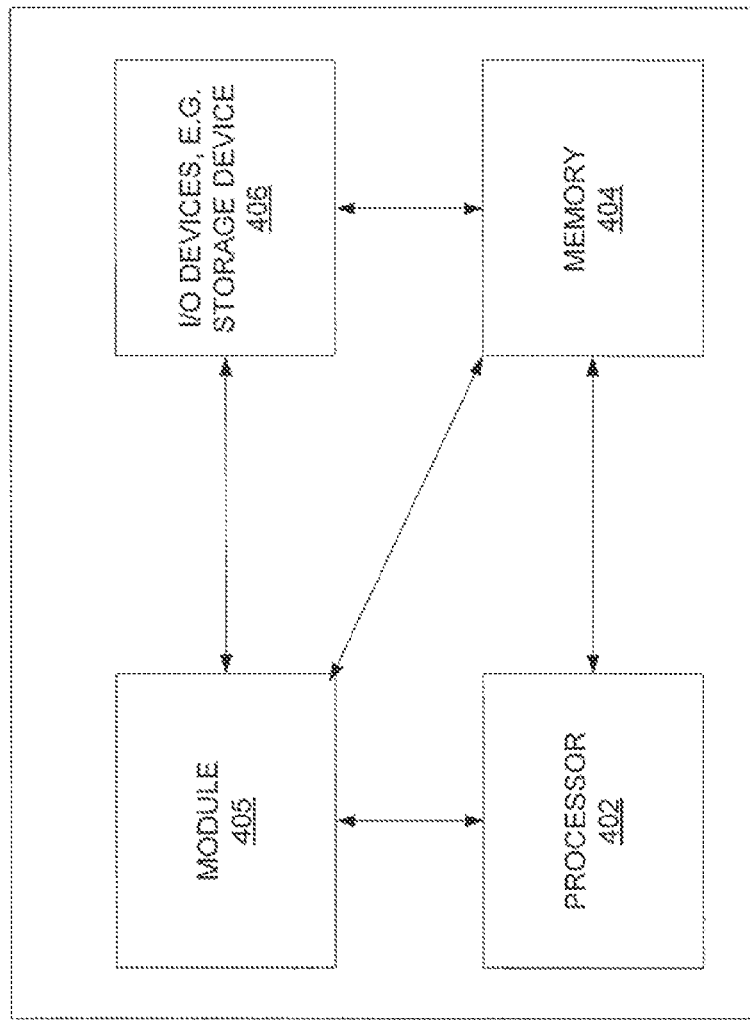
FIG. 4 depicts a high-level block diagram of a computer suitable for use in performing the functions described herein.

In one embodiment, the core network 102 may include a load balancer 104 and a DNS resolver 106. Although only a single load balancer 104 and a single DNS resolver 106 are illustrated, it should be noted that any number of load balancers 104 or DNS resolvers 106 may be deployed. In one embodiment, the load balancer 104 and/or the DNS resolver 106 may comprise a dedicated computer or application server as illustrated in FIG. 4 and discussed below.

In one embodiment, the load balancer 104 receives DNS queries directly from network elements and selects DNS resolvers such as the DNS resolver 106 to resolve the DNS queries. To this end, the load balancer 104 may monitor the DNS resolvers including the DNS resolver 106, order to determine their latency and workloads.

In one embodiment, the DNS resolver 106 may perform the methods and algorithms discussed below related to resolving domain name system queries in an expedited manner in a private network space. Among other functions, the DNS resolver 106 may route DNS queries to a hierarchy of DNS servers in order to determine the IP address corresponding to a host name specified in a DNS query.

In one embodiment, the core network 102 may further include the hierarchy of DNS servers, including DNS servers 116, 118, and 120. At least one of the DNS servers 118, 118, and 120 may be a private too-level DNS server that is not accessible within the public Internet space.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer or a mobile endpoint device such as a cellular telephone, a smart phone, a tablet computer, a laptop computer, as netbook, an ultrabook, a tablet computer, a portable media device (e.g., an MP3 player), a gaming console, a portable gaming device, and the like. It should be noted that although only four user endpoint devices are illustrated in FIG. 1 any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

Figure 2:
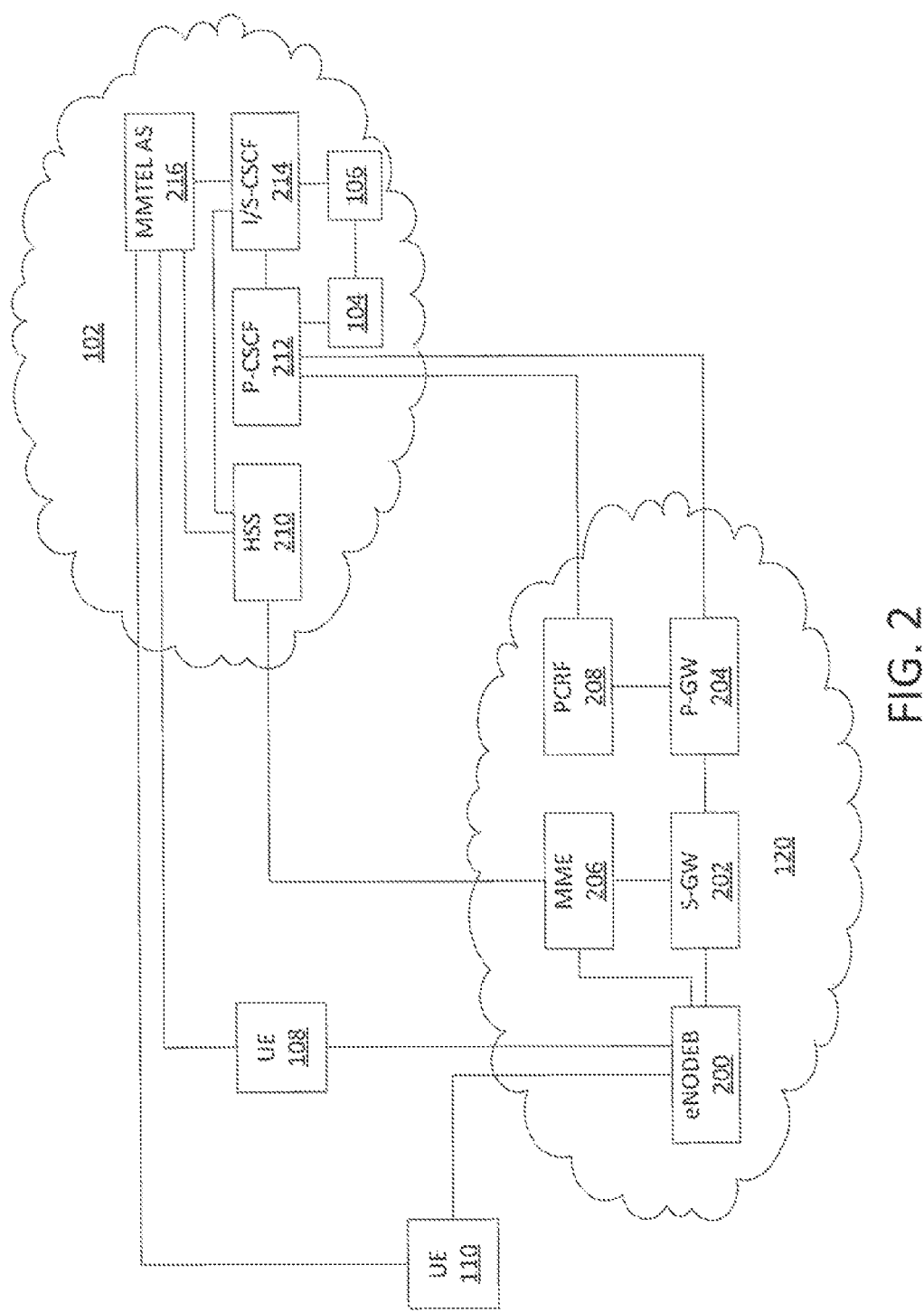
FIG. 2 is a block diagram depicting a portion of the communications network of FIG. 1 in greater detail.

FIG. 2 is a block diagram depicting a portion of the communications network 100 of FIG. 1 in greater detail. In particular, FIG. 2 illustrates some components of the core network 102 and the access network 120 (both access networks 120 and 122 may be configured as illustrated, but only access network 120 is shown for the sake of simplicity). The illustrated components are not meant to represent an exhaustive list of the components of each network, but rather represent the components necessary to support VoLTE service and other mobility services that may benefit from embodiments of the present disclosure.

Components of the access network 120 include an evolved Node B (eNodeB) 200, a serving gateway (S-GW) 202, a PDN gateway (P-GW) 204, a mobility management entity (MME) 206, and a policy charging and rules function (PCRF) 208.

The eNodeB 200 interfaces with the user endpoint devices 108, 110 and performs a plurality of functions including radio resource management, admission control, scheduling, enforcement of quality of service (QoS), cell information broadcast, ciphering and deciphering if user and control plane data, and compression and decompression of user plane packet headers. To this end, the eNodeB 200 hosts a plurality of layers (i.e., physical, medium access control, radio link control, and packet data convergence protocol) that include the functionality of user-plane header-compression and encryption.

The S-GW 202 routes and forwards user data packets. In particular, all IP packets (signaling plus bearer) traverse the S-GW 202, which is the local mobility anchor for bearers when the user endpoint device 108 or 110 moves between different eNodeBs or hands over to legacy 2G or 3G network access.

The P-GW 204 provides connectivity between the user endpoint devices 108, 110 and external packet data networks. Specifically, the P-GW 204 provides IP address management, QoS enforcement, and flow-based charging according top policy rules received from the PCRF 208 in order to act as a mobility anchor for non 3GPP technologies (e.g., CDMA, WiMAX, WiFi, fixed broadband networks). The P-GW 204 also connects IP bearers to the packet data networks.

The MME 208 is the control node for the LTE access network. The MME 206 processes the signaling between the user endpoint devices 108, 110 and the core network 102. To this end, the MME 206 performs bearer management (establishment, maintenance, and release) and connection management (establishing the data connection between the user endpoint devices 108, 110 and the core network 102).

The PCRF 208 provides policy control decisions and flow-based charging controls. In particular, the PCRF 208 instructs the network about enforcement of QoS policies based on information received from a subscriber policy repository, which may be part of the core network 102 (e.g., VoLTE or video bearer identifications).

Components of the core network 102 include a home subscriber server (HSS) 210, a proxy call session control function (P-CSCF) 212, an interrogating/serving call session control function (I/S-CSCF) 214, and a multimedia telephony application server (MMTel AS) 216.

The HSS 210 is a database that contains user-related and subscription-related data (e.g., QoS profiles, identification, authorization, and provisioned services). The HSS provides this information to the MME during user authentication.

The P-CSCF 212 is the initial point of contact for session signaling for the user endpoint devices 108, 110. In particular, the P-CSCF operates as a session initiation protocol (SIP) proxy by forwarding SIP messages between the user endpoint devices 108, 110 and the core network 102.

The I/S-CSCF 214 is the contact point within the core network 102 for all connections destined to a user of the core network 102. On IMS registration, it interrogates the HSS 210 to determine to which serving call session control function (S-CSCF) to route the request for registration. For mobile terminating calls, the I/S-CSCF 214 interrogates the HSS 210 to determine on which S-CSCF the user is registered. The I/S-CSCE 214 provides session set-up, session tear-down, session control, and session routing functions. The I/S-CSCF 214 generates records for billing purposes for all sessions under its control and invokes applications using application servers. The I/S-CSCF 214 also acts as a SIP registrar for user endpoint devices that the HSS 210 and I/S-CSCF 214 assign to it. The I/S-CSCF 214 queries the HSS 210 for the applicable, user profiles and handles can involving the user endpoint devices once the users have been registered. Depending on the function being performed, the description may make reference to the I/S-CSCF 214 as the "I/S-CSCF," the "I-CSCF," or the "S-CSCF." Finally, the core network 102 may include the load balancer 104 and the DNS resolver 106 as discussed above.

The MMTel AS 216 is an IMS application server that provides support for multimedia telephony services as defined by 3GPP (e.g., supplementary service functionality).

Figure 3:
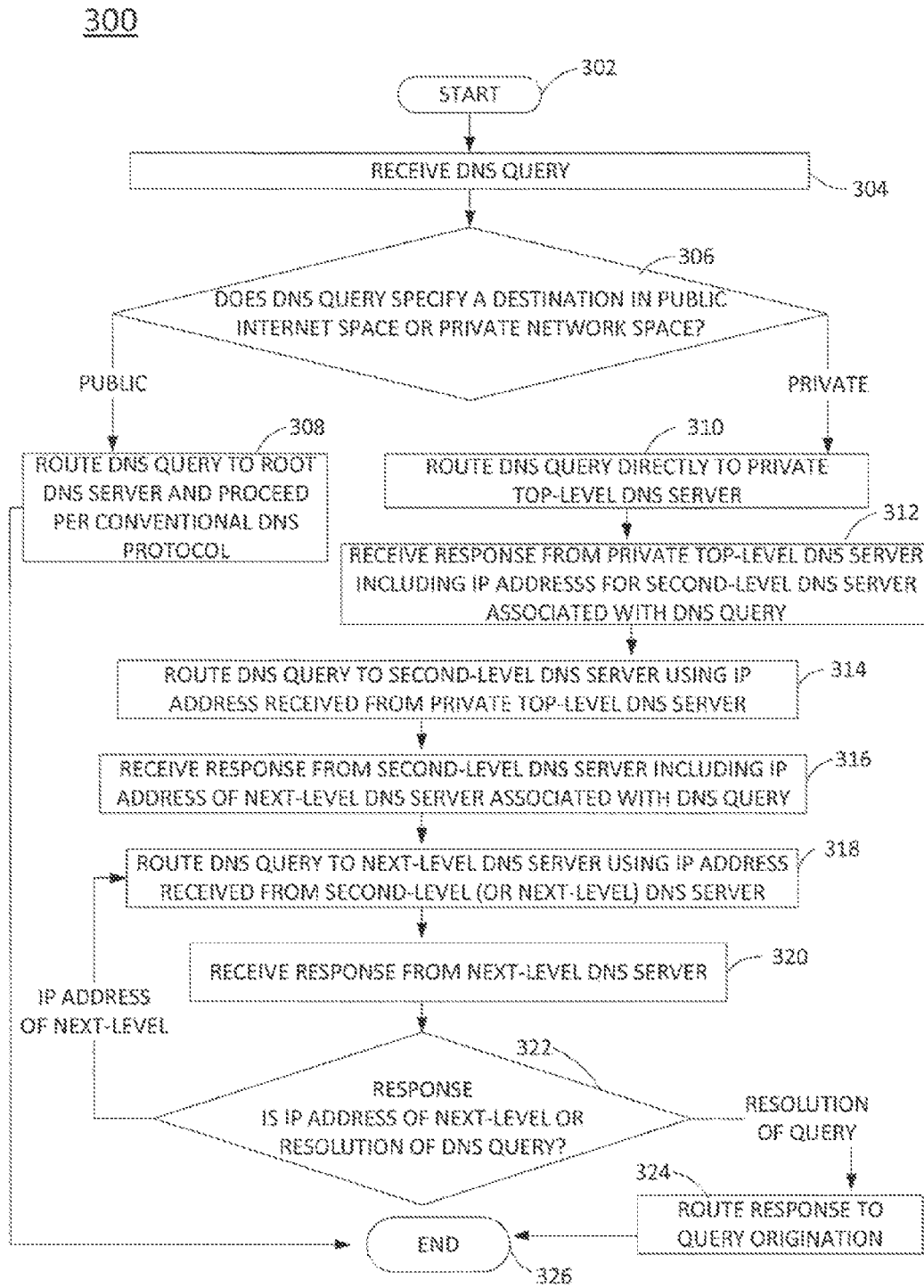
FIG. 3 illustrates a flowchart of an example method of the present disclosure for resolving domain name system queries in an expedited manner in a private network space.

FIG. 3 illustrates a flowchart of an example method 300 of the present disclosure for resolving domain name system queries in an expedited manner in a private network space, which in one embodiment is an IMS network (which may support, for example, VoLTE and/or other services). In one embodiment, the method 300 may be implemented in a DNS resolver, e.g., the DNS resolver 106 of FIG. 1, or in the computer or processor as described in FIG. 4.

The method 300 starts in step 302 and proceeds to step 304. In step 304, the DNS resolver receives a DNS query. The DNS query originates with an end-user device or a network element (e.g., a P-CSCF). The DNS query may be routed to the DNS resolver via a load balancer that seeks to assign the query to the DNS resolver having the lowest latency or lightest load The DNS query may be sent in accordance with any cast addressing methodologies that route queries to the topological nearest node in a group of potential receiving nodes. As an example, the DNS query may originate with the P-CSCF 212 of FIG. 2 and may comprise the domain name "a.isc.ch1il.usp.att.net," indicating that the P-CSCF element 212 is trying to reach the I-CSCF element 214.

In step 306, the DNS resolver determines whether the DNS query specifies a destination within the public Internet space or within a private network space. If the DNS resolver concludes that the DNS query specifies a destination within the public Internet space, then, in step 308, the DNS resolver routes the DNS query to a root DNS server so that the DNS query can be resolved in accordance with conventional DNS resolution protocols. The details of such protocols are known and therefore not discussed in detail here. The method 300 ends in step 326 after resolving the DNS query through conventional DNS protocols.

Alternatively, if the DNS resolver concludes that the DNS query specifies a destination in a private network space, then, in step 310, the DNS resolver bypasses the root DNS server and routes the DNS query directly to a private top-level DNS server. The private top-level DNS server is part of a private network infrastructure, such as a private MPLS space, and resides in the highest level within a hierarchy of DNS servers belonging to that private network infrastructure. For example, based on the example DNS query above, the domain name of the private top-level DNS server may be "usp.att.net."

In step 312, the DNS resolver receives a response from the private top-level DNS server. The response includes the IP address for a second DNS server—i.e., the second-level DNS server associated with the DNS query. The second-level DNS server resides in a lower level of the DNS server hierarchy relative to the top-level DNS server and may be a site-level private DNS server. For example, based on the example DNS query above, the second-level domain server may be "ch1il.usp.att.net."

In step 314, the DNS resolver routes the DNS query to the second-level DNS server, using the IP address provided by the top-level DNS server. For example, based on the example DNS query above, the DNS query may be routed to "ch1il.usp.att.net."

In step 316, the DNS resolver receives a response from the second-level DNS server. The response includes the IP address for a third DNS server—i.e., the next-(lower)-level DNS server associated with the DNS query. The next-level DNS server resides in a lower level of the DNS server hierarchy relative to the second-level DNS server. For example, based on the example DNS query above, the next-level domain server may be "isc/ch11.usp.att.net.".

In step 316, the DNS resolver routes the DNS query to the next-(lower)-level DNS server, using the IP address provided by the second-level DNS server. For example, based on the example DNS query above, the DNS query may be route d to "isc.ch1il.usp.att.net."

In step 320, the DNS resolver receives a response from the next-level DNS server. The response may include the IP address for a next-(lower)-level DNS server associated with the DNS query, if there is one. Alternatively, the response may include the full IP address of the DNS fully qualified domain name (FQDN) corresponding to the domain name specified in the DNS query (i.e., the resolution of the DNS query).

In step 322, the DNS resolver determines whether the response from the next-level DNS server includes the IP address of a next-level DNS server or a resolution of the DNS query. If the DNS resolver concludes in step 322 that the response includes the IP address of a next-level DNS server, then the method 300 returns to step 318 and routes the DNS query to the next-level DNS server as discussed above.

Alternatively, if the DNS resolver concludes in step 322 that the response includes the resolution of the DNS query, then the method 300 proceeds to step 324. In step 324, the DNS resolver routes the response (including the IP address corresponding to the domain name specified in the DNS query) to the entity from which the DNS query originated. In one embodiment, the response is routed via a load balancer. The originating element of the DNS query (e.g., the P-CSCF element in the example DNS query above) may then use the IP address to connect to the appropriate network element (e.g., the I-CSCF element in the example DNS query above).

The method 300 ends in step 326, after the DNS query has been resolved.

As such, the present disclosure provides expedited resolution of DNS queries that are directed to destinations in a private network space, e.g., services that are provided over a private MPLS space. The DNS queries can be resolved without routing the queries to a root DNS server, thereby reducing the round trip time necessary to determine the route.

Although the method 300 is described above within the example context of routing/call completion for IMS IP-based calls (E.g., as embodied by a P-CSCF element to I-CSCF element connection), the same principles can be used to facilitate other types of connections and services, including circuit-switched voice calling or mobility element (e.g., converged IP messaging (CPM) to universal service platform (USP) element (e.g., S-CSCF) connections. In the latter case, the bad balancer may be integrated with the DNS resolver, and a mobility DNS server for the mobility subdomain may be used to route queries and responses between the mobility element and the DNS resolver/load balancer.

In addition to resolving queries more quickly, the disclosed infrastructure is also capable of exercising tighter control over access to DNS services. For instance, the method 300 may be used by a top-level DNS server in a private network space to control which subdomains in the private network space can communicate with each other (e.g., which subdomains' DNS servers can communicate with each other). For instance, different services (e.g., mobility, WebRTC, IIP, etc.) may be associated with different dedicated DNS subdomains. This ability to tightly control access to DNS services can facilitate memory caching on DNS resolvers, since there is less need to cache large domain tree structures. Maintaining only a small cache of MPLS records, for instance, allows DNS of to be resolved more quickly.

FIG. 4 depicts a high-level block diagram of a computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for resolving domain name system queries, and various input/output devices 406 (e.g., m storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 300 as discussed above is implemented in a distributed or parallel manner for a particular illustrative example, i.e., the steps of the above method 300, or the entire method 300 is implemented across multiple or parallel computers, then the computer of this figure is intended to represent each of those multiple computers.

Furthermore, one or more hardware processors can be utilized in supporting a virtualized or shared computing environment. The virtualized reputing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 405 for resolving domain name system queries (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations" this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for resolving domain name system queries (including associated data structures) of the present disclosure can be stored on a tangible or physical (broadly non-transitory) computer-readable storage device or medium, e.g., volatile memory, non-volatile memory. ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
   determining, via a processor, that a domain name system query specifies a domain name of a destination residing in a private network space; and
   routing, via the processor, the domain name system query to a top-level domain name system server associated with the private network space, without routing the domain name system query to a root domain name system server in a public Internet space, wherein the top-level domain name system server resides in a highest level of a hierarchy of domain name system servers belonging to the private network space.

2. The method of claim 1, further comprising:
   receiving a response from the top-level domain name system server, wherein the response identifies an internet protocol address associated with a second domain name system server that resides in a lower level of the hierarchy relative to the top-level domain name system server; and
   routing the domain name system query to the second domain name system server, using the internet protocol address specified in the response from the top-level domain name system server.

3. The method of claim 2, further comprising:
   receiving a response from the second domain name system server, wherein the response includes an internet protocol address associated with a third domain name system server that resides in a lower, level of the hierarchy relative to the second domain name system server; and
   routing the domain name system query the third domain name system server, using the internet protocol address specified in the response from the second domain name system server.

4. The method of claim 2, further comprising:
   receiving a response from the second domain name system server, wherein the response includes an internet protocol address corresponding to the domain name of the destination; and
   routing the response from the second domain name system server to a source of the domain name system query.

5. The method of claim 4, wherein the response from the second domain name system server is routed to the source via a load balancer.

6. The method of claim 4, wherein the response from the second domain name system server is routed to the source via a mobility domain name system server associated with a mobility subdomain.

7. The method o claim 1, wherein the private network space is part of an internet protocol multimedia subsystem network.

8. The method of claim 1, wherein the private network space is a private multiprotocol label switching space.

9. The method of claim 1, wherein the destination is an interrogating call session control function element of the Internet protocol multimedia subsystem network.

10. The method of claim 1, wherein the destination is a serving call session control function element of the internet protocol multimedia subsystem network.

11. The method of claim 1, wherein the destination is part of a subdomain that provides a voice over long term evolution service.

12. The method of claim 1, wherein the destination is part of a subdomain that provides a carrier voice over interact protocol service.

13. The method of claim 1, wherein the destination is part of a subdomain that provides an Internet imaging protocol service.

14. The method of claim 1, wherein the destination is part of a subdomain that provides a web real-time communication service.

15. A non-transitory computer-readable storage device storing a plurality of instructions which, when executed by a processor, cause the processor to perform operations, the operations comprising:
    determining that a domain name service query specifies a destination residing in a private network space; and
    routing the domain name service query to a top-level domain name service server associated with the private network space, without routing the domain name service query to a root domain name service server.

16. The non-transitory computer-readable storage device of claim 15, wherein the operations further comprise:
    receiving a response from the top-level domain name system server, wherein the response identifies an internet protocol address associated with a second domain name system server that resides in a lower level of the hierarchy relative to the top-level domain name system server; and
    routing the domain name system query to the second domain name system server, using the Internet protocol address specified in the response from the top-level domain name system server.

17. The non-transitory computer-readable storage device of claim 16, wherein the operations further comprise:
    receiving a response from the second domain name system server, wherein the response includes an Internet protocol address associated with a third domain name system server that resides in a lower level of the hierarchy relative to the second domain name system server; and
    routing the domain name system query to the third domain name system server, using the internet protocol address specified in the response from the second domain name system server.

18. The non-transitory computer-readable storage device of claim 16, wherein the operations further comprise:
    receiving a response from the second domain name system server wherein the response includes an internet protocol address corresponding to the domain n me of the destination; and
    routing the response from the second domain name system server to a source of the domain name system query.

19. The non-transitory computer-readable storage device of claim 18, wherein the response from the second domain name system server is routed to the source via a load balancer.

20. An apparatus comprising:
    a processor; and
    a computer-readable storage device storing a plurality of instructions which, when executed by the processor, cause the processor to perform operations, the operations comprising:
        determining that a domain name service query specifies a destination residing in a private network space; and
        routing the domain name service query to a top-level domain name service server associated with the private network space, without routing the domain name service query to a root domain name service server.

* * * * *